United States Patent [19]
Takechi et al.

[11] Patent Number: 5,513,191
[45] Date of Patent: Apr. 30, 1996

[54] ASYNCHRONOUS TRANSFER MODE (ATM) CELL ERROR PROCESSING SYSTEM

[75] Inventors: Ryuichi Takechi; Takeshi Kawasaki; Jyoei Kamoi; Kazuo Hajikano; Satoshi Kuroyanagi; Toshio Shimoe, all of Kawasaki, Japan

[73] Assignee: Fujitsu Limited, Kawasaki, Japan

[21] Appl. No.: 888,787

[22] Filed: May 27, 1992

[30] Foreign Application Priority Data

May 27, 1991 [JP] Japan .................................. 3-121070

[51] Int. Cl.⁶ .................................................... G06F 11/10
[52] U.S. Cl. ........................... 371/37.1; 370/60; 370/94.1; 370/13
[58] Field of Search .................................. 371/37.1, 21.6, 371/8.1; 370/94.1, 13, 16, 60, 79, 80, 91, 53; 340/825.16, 825.21; 395/575

[56] References Cited

U.S. PATENT DOCUMENTS

| | | | |
|---|---|---|---|
| 5,153,578 | 10/1992 | Izawa et al. | 340/825.21 |
| 5,228,028 | 7/1993 | Cucchi et al. | 370/94.1 |
| 5,274,633 | 12/1993 | Kato et al. | 370/60 |

*Primary Examiner*—Robert W. Beausoliel, Jr.
*Assistant Examiner*—Phung My Chung
*Attorney, Agent, or Firm*—Staas & Halsey

[57] ABSTRACT

An Asynchronous Transfer Mode (ATM) cell error processing system includes a plurality of error detectors for respectively detecting predetermined cell errors and for respectively generating decision signals and an error editing unit which is operatively coupled to the error detector and determines, based on the decision signals, whether or not a cell related to the decision signals should be discarded. A buffer, which is coupled to at least one of the error detectors, temporarily stores the cell. An error cell discarding unit, which is coupled to the error editing unit and the buffer, discards the cell from the buffer when the error editing unit determines that the cell should be discarded and relays the cell when the error editing unit determines that the cell should not be discarded.

16 Claims, 15 Drawing Sheets

| ITEM | LAYER | ERROS TO BE DETECTED |
|---|---|---|
| 1 | ATM | ARRIVAL OF CELL HAVING UNDEFINED VPI/VCI |
| 2 | ATM | ABNORMAL VALUE OF PT |
| 3 | ATM | ABNORMAL VALUE OF HEC |
| 4 | AAL | ABNORMAL VALUE OF SN (LOSS OF CELL) |
| 5 | AAL | ABNORMAL VALUE OF ST (LOSS OF CELL) |
| 6 | AAL | ABNORMAL VALUE OF LI |
| 7 | AAL | ABNORMAL VALUE OF CRC (ERROR IN DATA) |

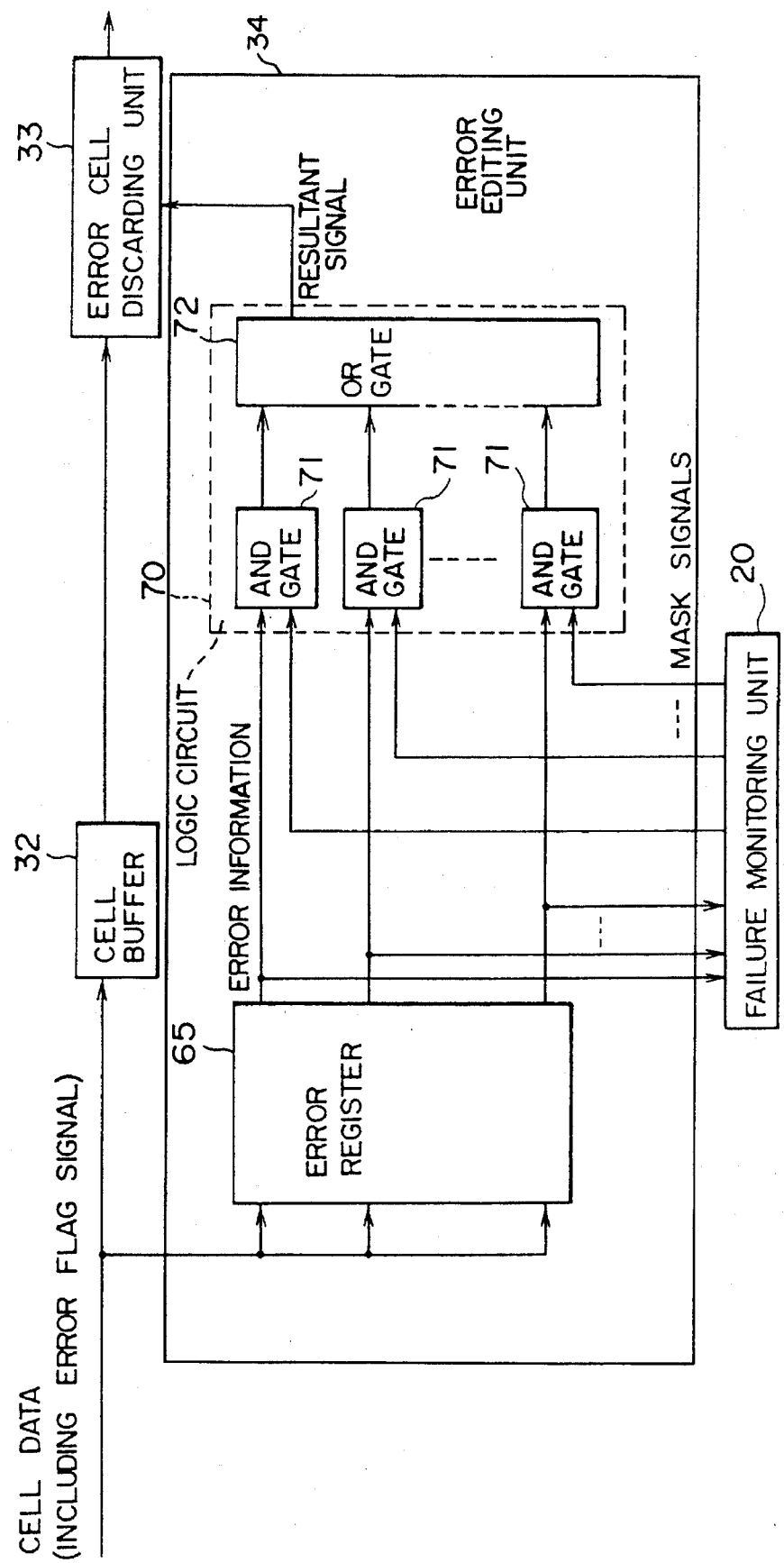
F I G. 15

ASYNCHRONOUS TRANSFER MODE (ATM) CELL ERROR PROCESSING SYSTEM

BACKGROUND OF THE INVENTION

1. Field of the Invention

The present invention generally relates to communications networks employing an ATM (Asynchronous Transfer Mode) transmission system. More particularly, the present invention is concerned with an ATM cell error processing system which detects an error in an ATM cell and processes such a defective ATM cell in a predetermined manner.

2. Description of the Prior Art

Recently, there has been considerable activity in the development of ATM transmission systems. As is well known, ATM cells have a format as shown in FIG. 1. FIG. 1-(a) shows an ATM layer data format, and Fig:. 1-(b) shows an AAL (ATM Adaptation Layer) data format. In the AAL, there are four types of data formats with respect to services in upper layers. FIG. 1-(b) shows a data format of a class 3 AAL, which is one of the four types of data formats, and which provides connection-oriented data communications services The ATM cell consists of a header having five bytes (B), and an information field having 48 bytes. The ATM header includes a four-bit (b) undefined GFC (Generic Flow Control) field, an 8-bit VPI (Virtual Path Identifier) field, and a 16-bit VCI (Virtual Channel Identifier) field. The VPI and VCI are basic data used when an ATM switch determines a route. Further, the ATM cell includes a 2-bit PT (Payload Type), a one-bit RS (Reserved) field, a one-bit CLP (Cell Loss Priority) field, and an 8-bit HEC (Header Error Control) field. Data in the CLP field shows whether or not the ATM cell should be discarded. The HEC is a CRC (Cyclic Redundancy Check) for the ATM header.

The ATM header consists of a total of 40 bits, which is equal to five bytes. The information field contains 44 bytes of information and an additional four bytes of data, as shown in FIG. 1-(b). The four-byte data contained in the information field includes two bits of data representing a segment type (ST), four-bit data showing a sequence number (SN), 10 received bits (RES), six-bit length identifier (LI) data, and ten bits representing CRC data. The segment type (ST) data is used for identifying the beginning and end of a message. The sequence number (SN) data represents the position of the cell in the message. The length identifier (LI) data represents the actual length of information. The 10-bit CRC data is error correction code for the information field.

FIG. 2 shows an overview of an ATM switching system, which comprises an ATM switch (or TC layer terminating equipment), and a message processing unit 2. The message processing unit 2 comprises a sender-side cell processor 2a, and a receiver-side cell processor 2b. The message processing unit 2 exchanges ATM cells with protocol data units (messages) in an upper layer. The sender-side cell processor 2a segments a message from the upper layer into units, each consisting of 44 bytes, and forms ATM cells conforming to the format shown in FIG. 1. The receiver-side cell processor 2b assembles ATM cells from the ATM switch 1 into a message conforming to the upper layer.

The receiver-side cell processor 2b has a function of detecting an error in cell unit in order to determine whether or no teach cell is correct. FIG. 3 shows types of cell errors. In FIG. 3, three cell errors to be detected are defined for the ATM layer, and four cell errors to be detected are defined for the AAL.

FIG. 4 is a diagram showing an overview of a conventional ATM cell error processing system. As shown in FIG. 4, the system includes a plurality of serially connected error processors 10 equal in number to the types of cell errors to be detected. The error processors 10 operate independently from each other, and each have the function of detecting a predetermined cell error, discarding an error cell and notifying a failure monitor unit 20 of detected error information.

FIG. 5 shows the structure of each of the error processors 10 shown in FIG. 4. Each error processor 10 comprises an error check unit 21, a cell buffer 22 and an error cell discarding unit 23. The error check unit 21 receives an ATM cell and determines whether or not the ATM cell has a predetermined error. During this determination process, the ATM cell is queued in the cell buffer 22. If the error check unit 21 determines that the ATM cell has the predetermined error, it outputs a cell discarding instruction to the error cell discarding unit 23. In response to receipt of the cell discarding instruction, the error cell discarding unit 23 discards the ATM cell. The error check unit 21 then informs the failure monitor unit 20 of the result of the check.

However, the conventional ATM cell error processing systems as described above have the following disadvantages.

Firstly, the cell buffer 22 must be provided in each error processor 10 in order to detect an error cell and discard it. Hence, a large quantity of hardware is needed to configure the system and a large amount of cell delay is introduced. It should be noted that the cell error detecting processes are sequentially carried out by the error processors 10 in a predetermined order, because if a cell error has been detected during a series of error detecting processes, it is no longer necessary to execute the remaining cell error detecting processes. For example, the procedure for detecting cell errors checks the fields in the order HEC, VCI, PT, CRC, ST, SN, MID and LI.

Secondly, with respect to some check items, it is necessary to determine whether or not each ATM cell has cell errors defined in these check items, but is not necessary to discard each ATM cell even if the cell errors have been detected. The above is called an error masking function. In order to establish the error masking function, the system shown in FIG. 4 is modified, as shown in Fig, 6. The failure monitor unit 20 outputs mask instructions to the error processors 10 which are to execute the error masking function. However, the system shown in FIG. 6 has the following disadvantages. The control process of the failure monitor unit 20 is very complicated because it must individually output mask instructions to the error processors 10. Further, the ATM cells must be held in the cell buffers 22 even when these ATM cells are defective but not discarded.

Thirdly, an error editing process based on the results of error check is very complicated or impossible because the error processors 10 separately generate the cell discarding instructions. For example, it is impossible to discard an ATM cell when it has a plurality of errors selected from among the predetermined cell error types.

SUMMARY OF THE INVENTION

It is a general object of the present invention to provide an improved ATM cell error processing system in which the above disadvantages are eliminated.

A more specific object of the present invention is to efficiently detect cell errors and efficiently execute an error editing process.

The above objects of the present invention are achieved by an ATM cell error processing system comprising: a plurality of error detection unit for respectively detecting predetermined cell errors and for respectively generating decision signals an error editing unit, operatively coupled to the error detection unit, for determining, on the basis of the decision signals, whether or not a cell related to the decision signals should be discarded. A buffer, coupled to at least one of the error detection unit for temporarily storing the cell; and an error cell discarding unit coupled to the error editing unit and the buffer unit, for discarding the cell from the buffer unit when the error editing unit determines that the cell should be discarded and for relaying the cell when the error editing unit does not determine that the cell should be discarded.

BRIEF DESCRIPTION OF THE DRAWINGS

Other objects, features and advantages of the present invention will become more apparent from the following detailed description when read in conjunction with the accompanying drawings, in which:

FIG. 15 is a block diagram of another structure of the error editing unit used in the embodiments of the present invention;

DESCRIPTION OF THE PREFERRED EMBODIMENTS

Figure 7:
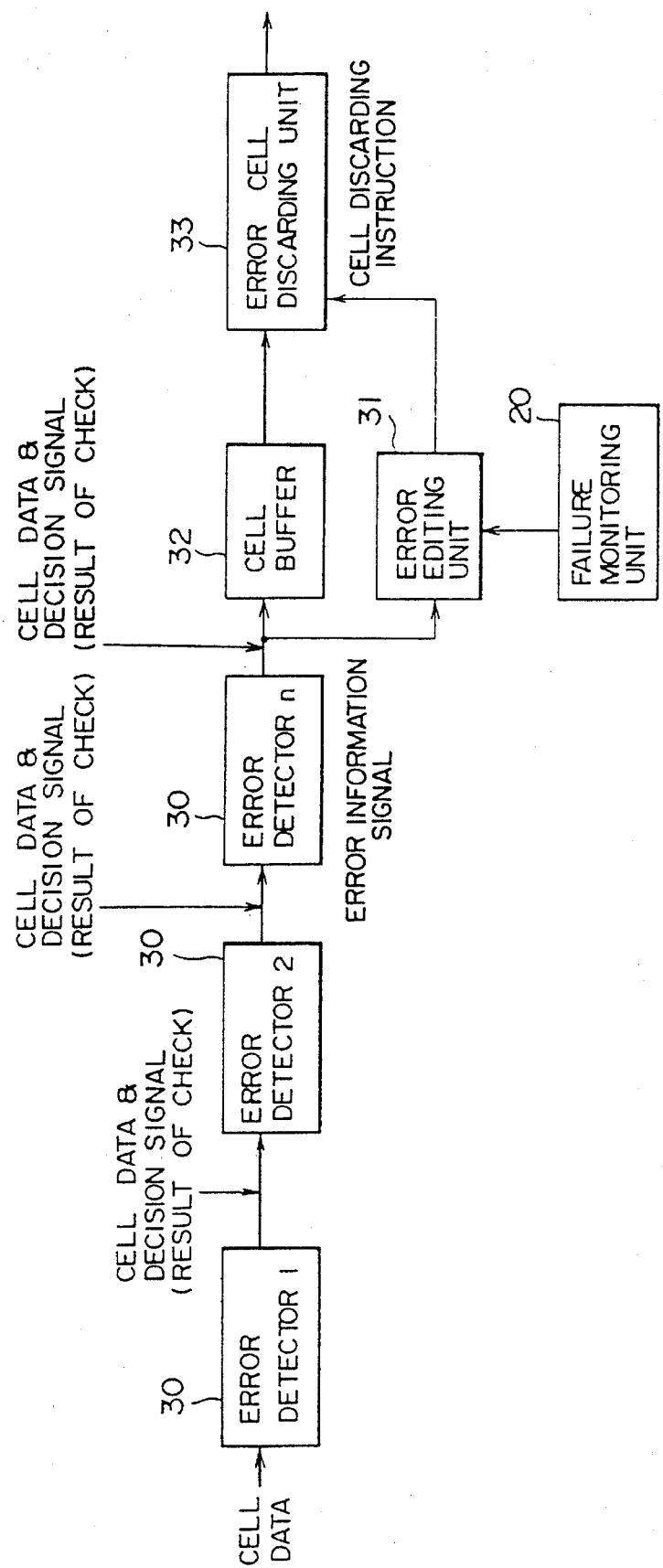
FIG. 7 is a block diagram of an ATM cell error processing system according to a first embodiment of the present invention.

FIG. 7 shows an ATM cell error processing system according to a first embodiment of the present invention.

The system shown in FIG. 7 comprises error detectors 30 connected in series through a cell data line. The ATM cells and the check results are transferred through the error detectors 30. When it is required that n types of cell errors be detected, n error detectors 30 are connected in series. An error editing unit 31, which is connected to an output terminal of the error detector 30 of the final stage, receives error information therefrom, and in response, may generate a cell discarding instruction to indicate the need to execute an error process, such as a cell discarding process. A cell buffer 32, which is connected to the output terminal of the error detector 30 of the final stage, temporarily stores an ATM cell received therefrom. An error cell discarding unit 33, which is connected to an output terminal of the cell buffer 32, discards an error cell in response to receipt of a cell discarding instruction from the error editing unit 31. A failure monitor unit 20 communicates with the error editing unit 31.

Each of the error detectors 30 checks whether or not the received cell has a predetermined cell error, and notifies the subsequent error detector 30 of the result of the check by a decision signal. It should be noted that each of the error detectors 30 does not have the function of discarding cells, The error editing unit 31 receives the results of the check obtained in the error detectors 30 via the error detector 30 of the final stage, and creates the cell discarding instruction on the basis of the received result of the check.

Figure 1:
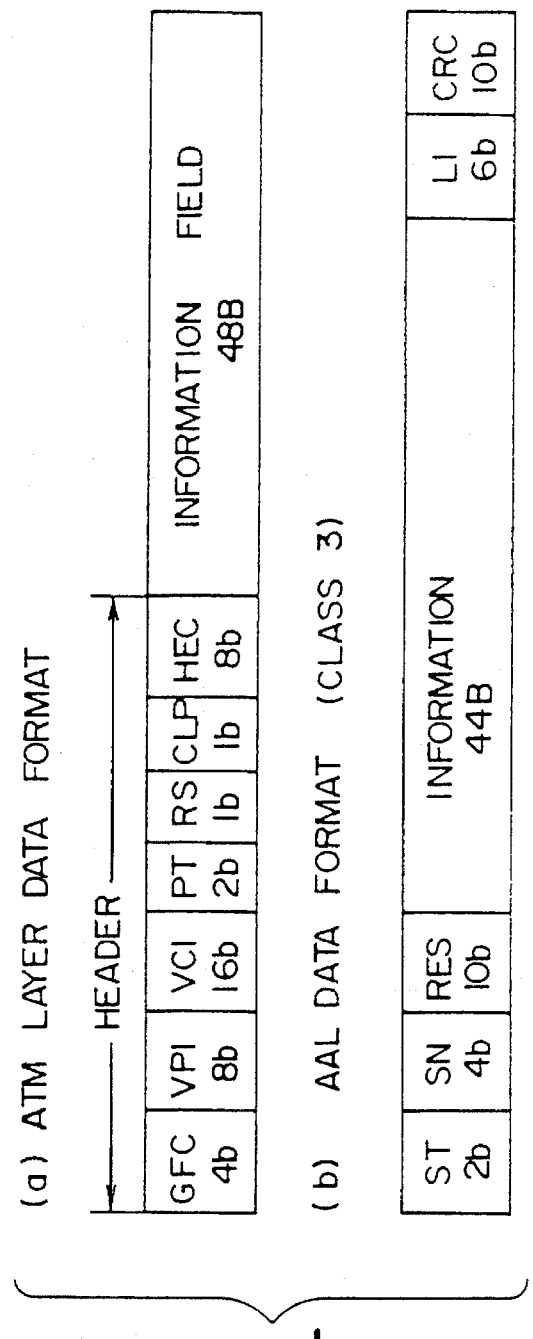
FIG. 1 is a diagram showing ATM cell formats.
Figures 2, 3:
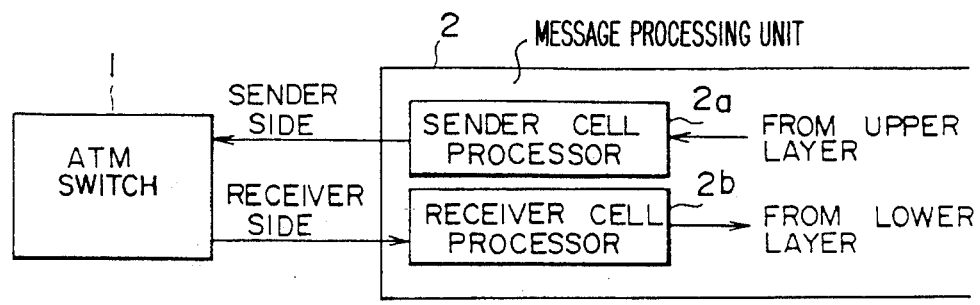
FIG. 2 is a block diagram showing an overview of a conventional ATM switching system.
FIG. 3 is a diagram showing types of cell errors.
Figure 4:
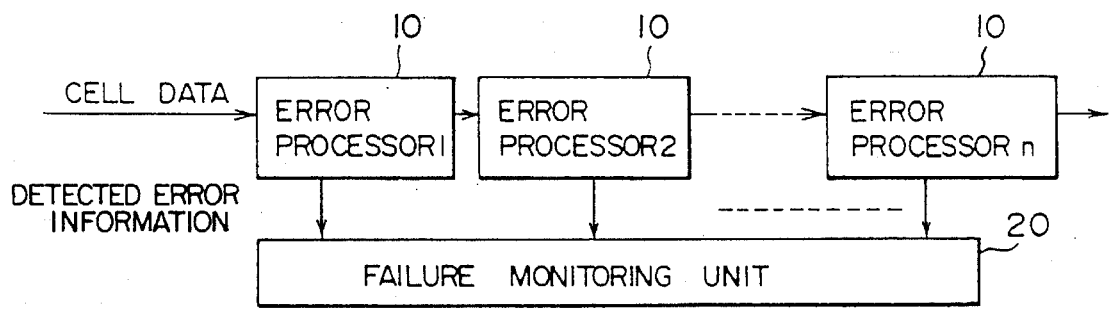
FIG. 4 is a block diagram of a conventional ATM cell error processing system.
Figure 5:
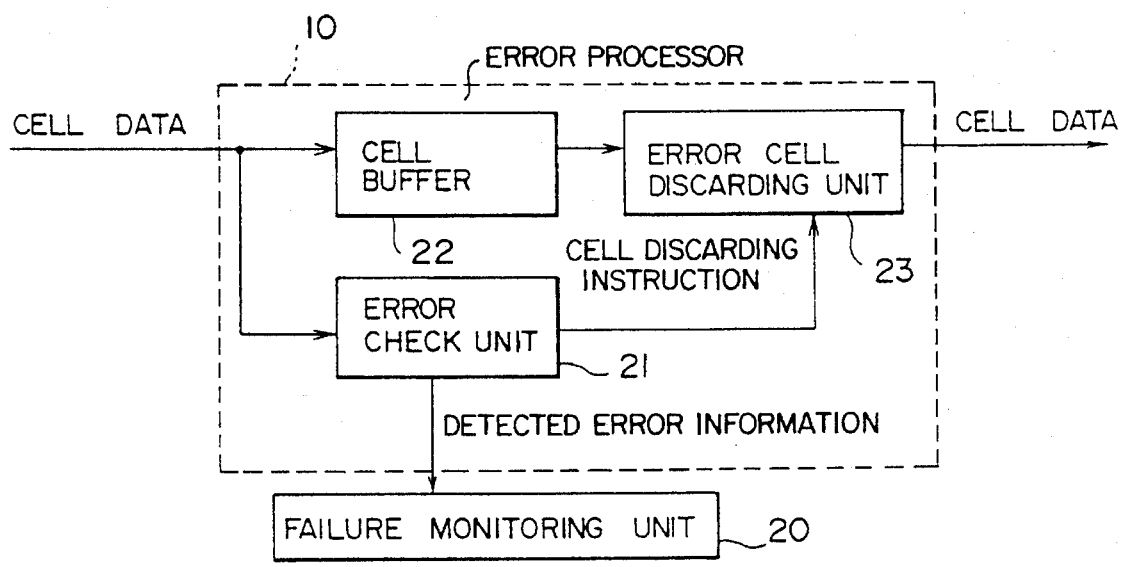
FIG. 5 is a block diagram of each error processor shown in FIG. 4.

It should be noted that each of the error detectors 30 does not have a cell buffer as did the error processors shown in FIG.5. Hence, it becomes possible to reduce the hardware structure of the system. In addition, the results of the check obtained by the error detectors 30 are gathered in the error editing unit 31. Therefore it becomes possible to conduct error editing efficiently.

Two different means all available for informing the error editing unit 31 of the result of the check obtained by the error detectors 30. The first means places the check result obtained in each of the error detectors 30 in a predetermined bit position of the next cell. The second means comprises and error flag signal line which carries and error flag signal and couples the error editing unit 31 is to the error detectors 30. The results of the check are then placed in predetermined bit positions of the error flag signal.

Figure 8:
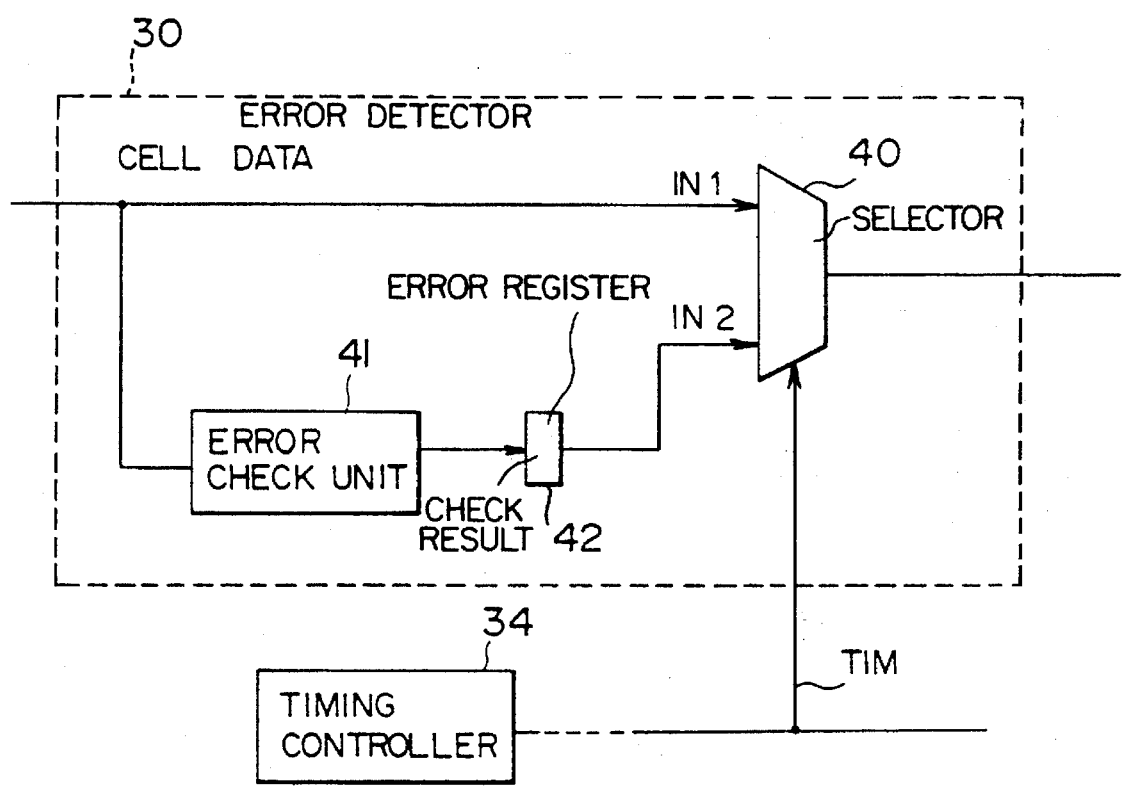
FIG. 8 is a block diagram of an error detector shown in FIG. 7.

FIG. 8 shows the structure of each of the error detectors 30, which conform to the above-mentioned first means. Each of the error detectors 30 comprises a selector 40, an error check unit 41, and an error register 42. The selector 40 allows an input signal IN2 to pass in only a specific time slot, and allows an input signal IN1 to pass in other slots. The above selecting operation of the selector 40 is controlled by a timing signal TIM generated by a timing controller 34. The timing signal TIM is maintained at, for example, a high level in only the specific time slot. The error check unit 41 receives the cell and determines whether or not the cell has a predetermined cell error. More specifically, the error check unit 41 drops, from the received cell, data necessary for determining whether or not the cell received has the predetermined cell error. Data showing the result of the check is written into the error register 42, so that the content of the error register 42 is updated at each cell. In response to receipt of the timing signal TIM, the selector 40 selects the error register 42. In this manner, the result of the check obtained by the error detector shown in FIG. 8 is placed in a predetermined position in the cell data.

Figure 9:
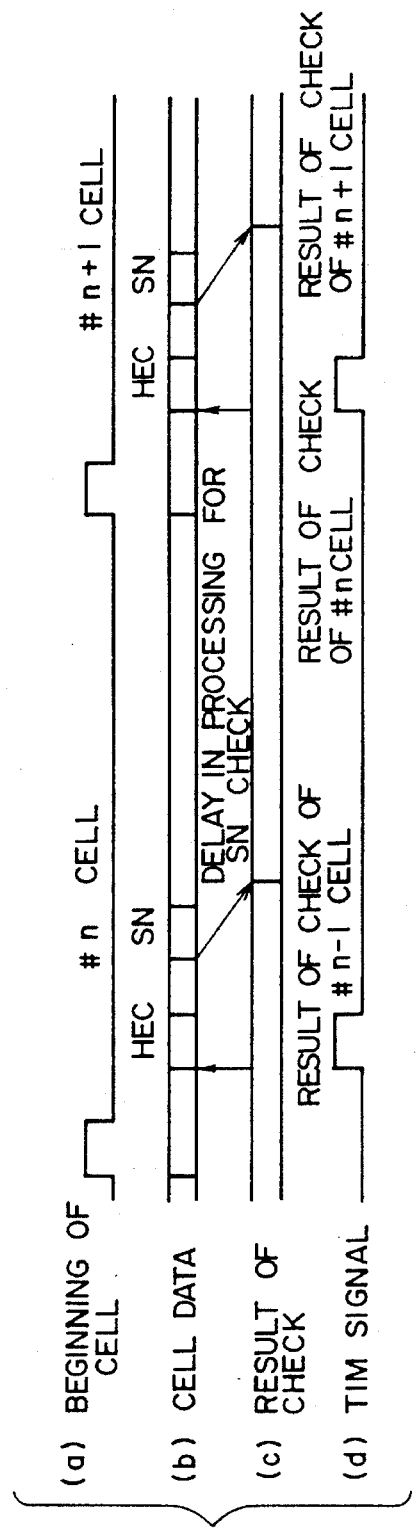
FIG. 9 is a timing chart showing the operation of the error detector shown in FIG. 8.

FIG. 9 is a timing chart showing the operation of one of the error detectors 30. The error detector 30 being considered determines whether or not the sequence number contained in the cell is correct and inserts the result of this check into the HEC field of the next cell. FIG. 9-(a) shows the beginnings of the cells, FIG. 9-(b) shows cell data, FIG. 9-(c) shows the results of checks cell, and FIG. 9-(d) shows the timing signal TIM.

The result of the sequence number check on the cell #n−1 is written into the HEC field of the cell #n. The error check unit 41 executes the sequence number check on the cell #n during the time when the #n cell is passing through the error detector 30. The result of the sequence number check is written into the error register 42, and then written into the HEC field of the #n+1 cell subsequent to the cell #n while the cell #n+1 is passing through the error detector 30.

Figure 10:
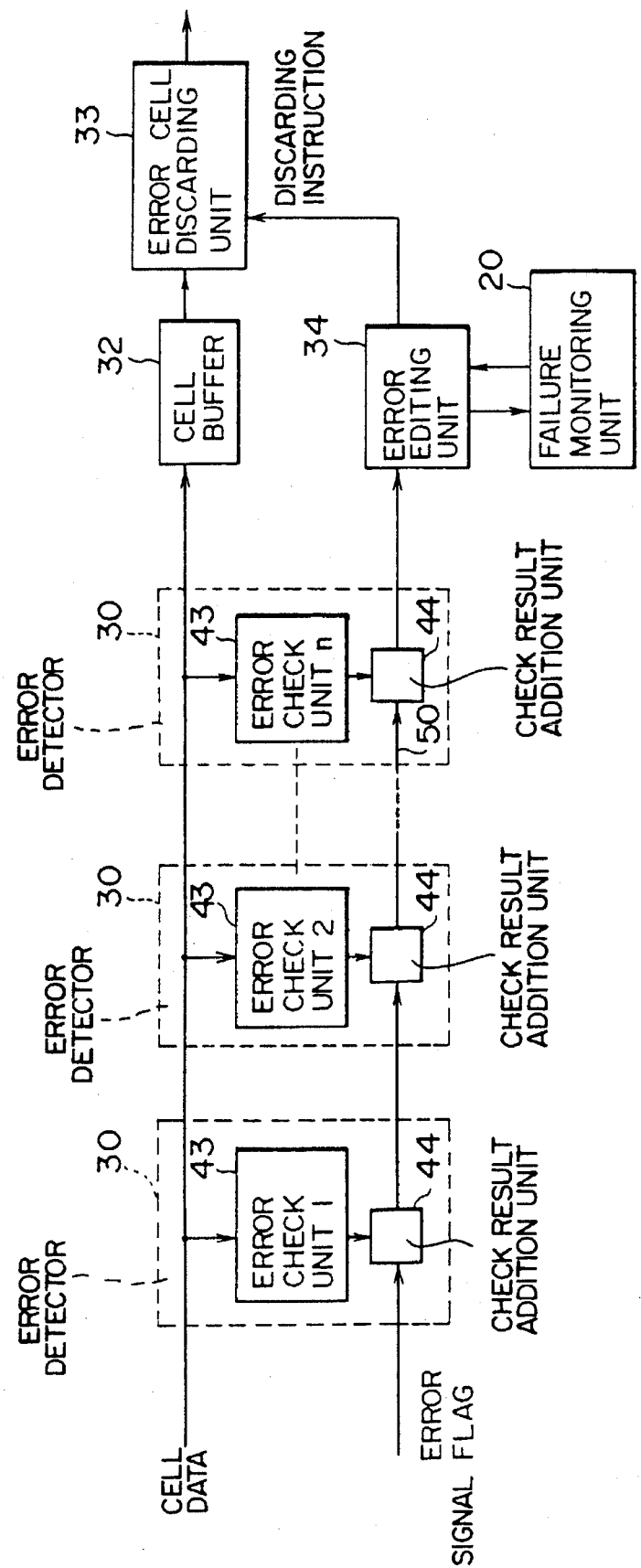
FIG. 10 is a block diagram of an ATM cell error processing system according to a second embodiment of the present invention.

FIG. 10 is a block diagram of the ATM cell error processing system of a second embodiment of the present invention designed to realize the aforementioned second means for informing the error editing unit 34 of the results of the checks obtained in the error detectors 30. An error signal flag line 50 is provided separately from the cell data line. Each of the error detectors 30 comprises error check units 43, and check result addition units 44. The error flag signal is synchronized with the cell data, and the bit position from the beginning of the cell shows the error content. The output terminal of the check result addition unit 44 of the final stage is connected to the input terminal of the error editing unit 34.

The error check units 43 check the respective cells, and inform the corresponding check result addition units 44 of the results of the checks. For example, the check result addition units 44 are transferred data "0" when no errors have been detected, and data "1" when the predetermined errors have been respectively detected.

Figure 11:
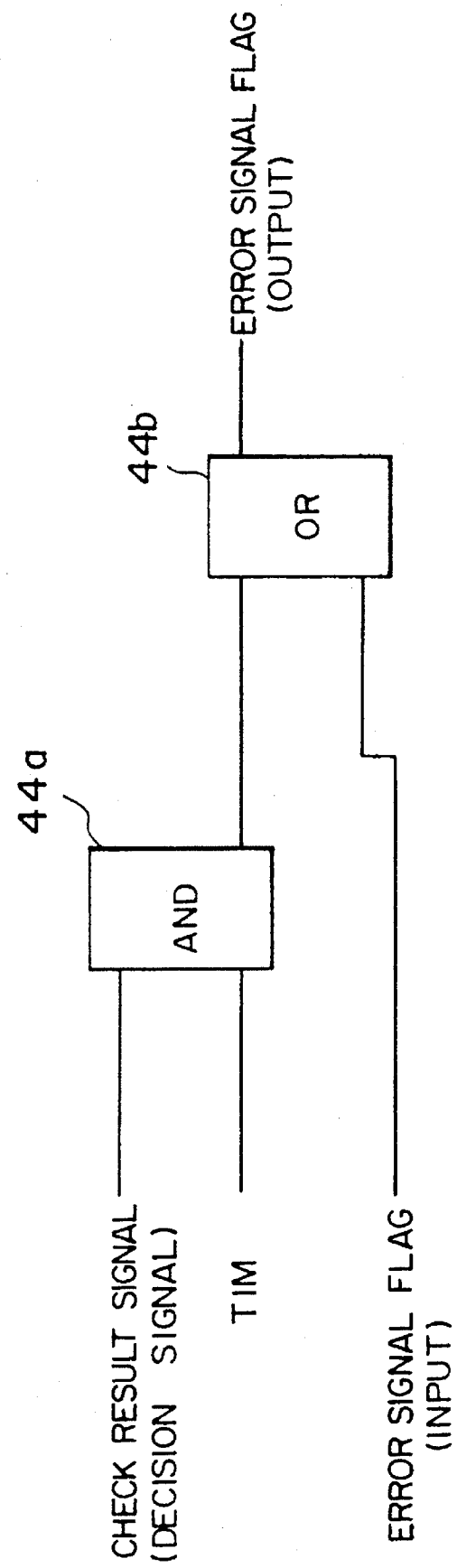
FIG. 11 is a block diagram of a check result addition circuit shown in FIG. 10.

FIG. 11 shows the structure of each of the check result addition units 44. Each unit 44 comprises an AND gate 44a, and an OR gate 44b. The AND gate 44a receives a check result signed showing the result of the check and a timing signal TIM for inserting the result of the check in the predetermined bit position. The timing signal TIM is generated by, for example, the timing generator 34 shown in FIG. 8. The OR gate 44b receives the error flag signal and an output signal of the AND gate 44a, and outputs the error flag signal together with the check result from the AND gate 44a inserted therein. The timing signal TIM indicates the bit position in the error flag signal into which the check result should be inserted. In this manner, the results of the checks are inserted into the respective bit positions in the error flag signal. The error editing unit 34 receives the error flag signal thus formed, and executes a predetermined editing process, such as a cell discarding process.

Figure 12:
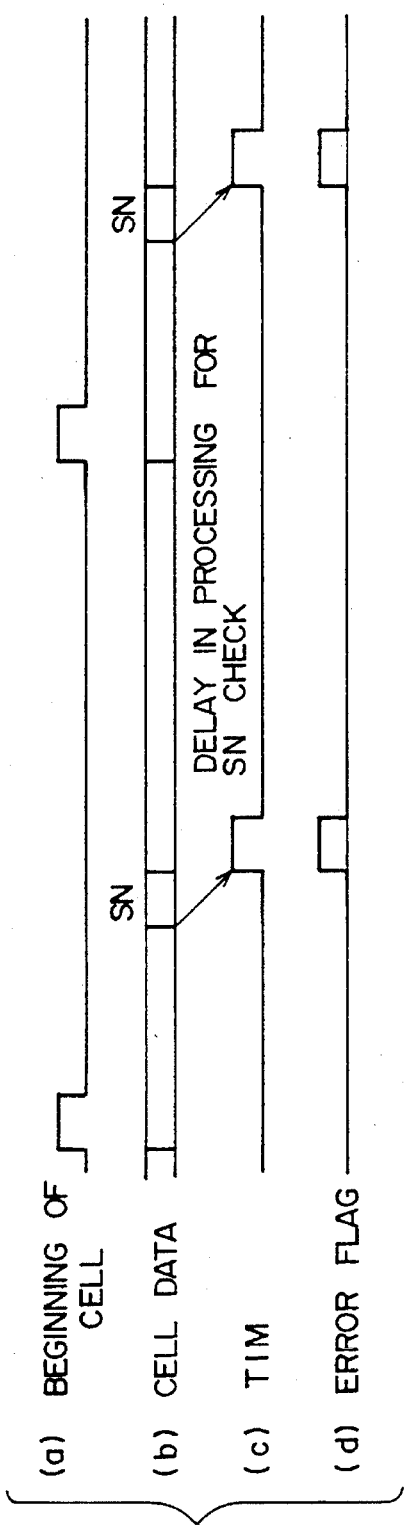
FIG. 12 is a timing chart showing the operation of an error detector shown in FIG. 10.

FIG. 12 is a time chart showing the operation of one of the error detectors 30, which determines whether or not the sequence number is correct. FIG. 12-(a) shows the beginnings of the cells, FIG. 12-(b) shows cell data, FIG. 12-(c) shows the timing signals (TIM) for inserting the result of check into the predetermined bit position, and FIG. 12-(d) shows the error flag signal. When the error check unit 42 detects an error in the sequence number SN, the result of the check is inserted into the predetermined bit position in response to the timing signal TIM.

Figure 13:
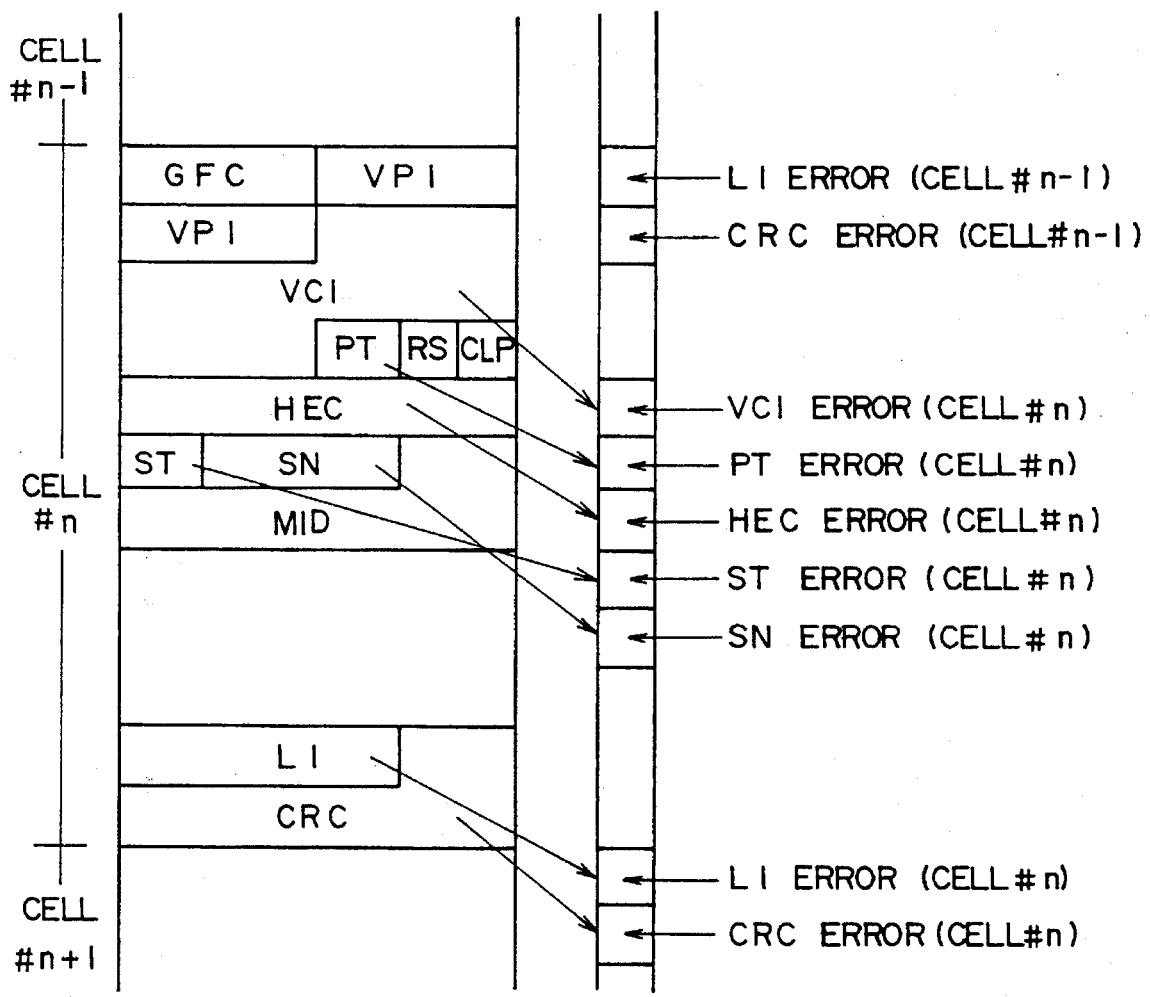
FIG. 13 is a diagram showing error flags used in the second embodiment of the present invention.

FIG. 13 is a diagram showing error flags to be detected in the above-mentioned embodiment. In FIG. 13, cell data is illustrated so that it is processed in parallel form in groups of eight bits.

Figure 14:
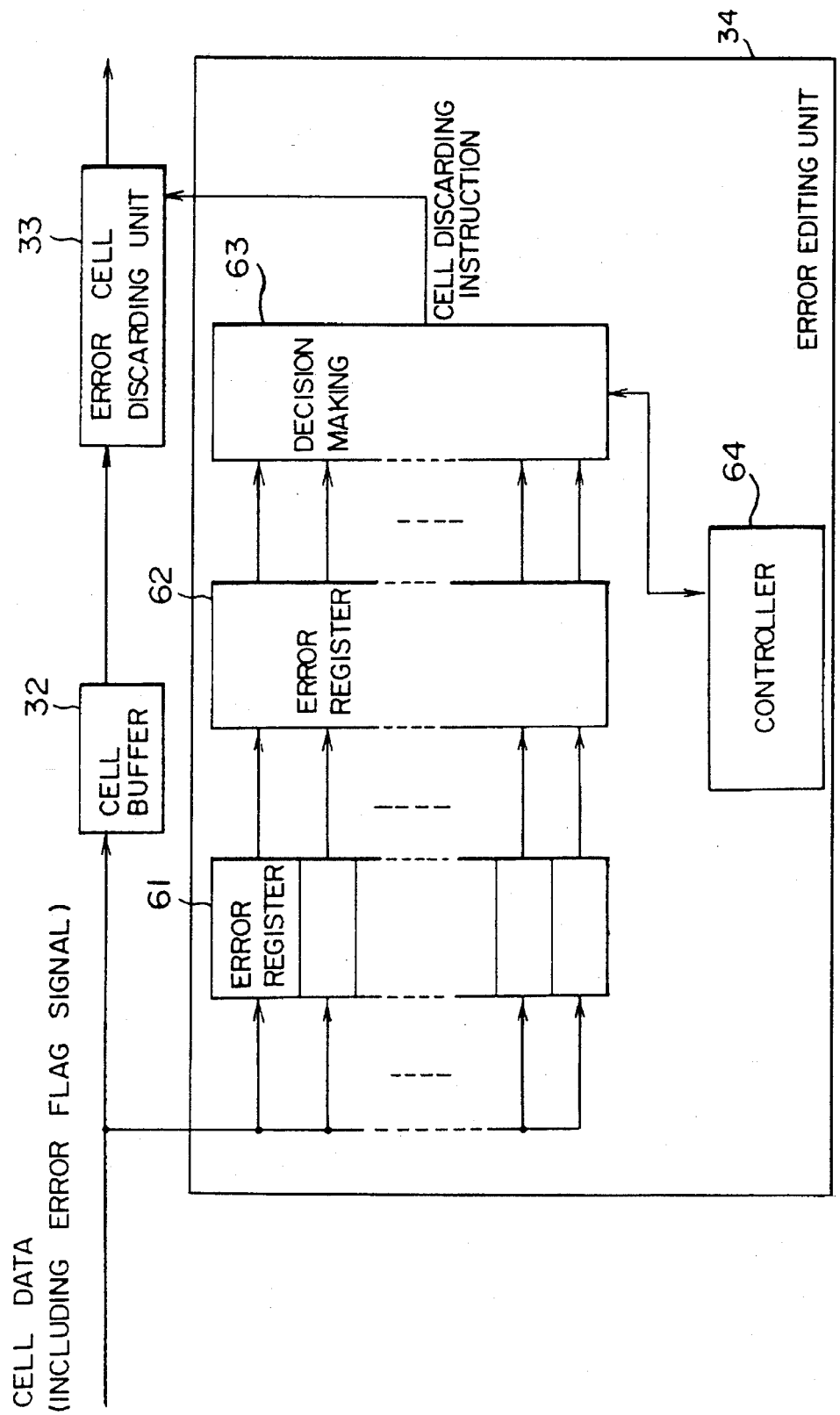
FIG. 14 is a block diagram of an error editing unit used in the embodiments of the present invention.

FIG. 14 shows the structure of the error editing unit 34 in detail. In FIG. 14, parts which are the same as those shown in the previously described figures are given the same reference numerals. The following description of the error editing unit 34 will be given without distinguishing the aforementioned first and second means from each other.

The error editing unit 31 comprises an error register 61, an error register 62, a decision making unit 63, and a controller 64, such as a processor. The error register 61 reads the error information from the cell data (first means) or the error flag signal (second means), and temporarily stores the error information. The error register 62 is updated when the error information concerning all error types to be detected for the cell being considered has been written in the error register 61. Under the control of the controller 64, the decision making unit 63 makes a decision, on the basis of the error information stored in the error register 62, on whether or not the cell being considered should be discarded. For example, if at least one cell error has been detected, the cell is discarded. If the cell should be discarded, the decision making unit 63 outputs the cell discarding instruction to the error cell discarding unit 33. In response to receipt of the cell discarding instruction, the error cell discarding unit 33 discards the error cell. In the above manner, each cell is temporarily stored (queued) in only the cell buffer 32. This facilitates error editing processing.

FIG. 15 is a block diagram showing another structure of the error editing unit 31. In FIG. 15, those parts which are the same as those shown in the previously described figures are given the same reference numerals. The error editing unit 31 shown in FIG. 15 comprises an error register 65, and a logic circuit 70. The error register 65 has the functions of both the registers 61 and 62 shown in FIG. 14. The controller 64 shown in FIG. 14 is omitted in FIG. 15 for the sake of simplicity. Error information concerning all the error items is supplied to the failure monitor unit 20.

The logic circuit 70 functions to define arbitrary combinations of necessary error data in the error information stored in the error register 65, and to discard mask information supplied from, for example, the failure monitor unit 20. The discard mask information may be supplied from the controller 64. The logic circuit 70 comprises a plurality of AND gates 71, and an OR gate 72. The AND gates 71 are supplied with the error information concerning the error items and the discard mask information. That is, each of the AND gates 71 receives one of the bits forming the error information and one of the bits forming the discard mask information, and outputs a resultant signal to the OR gate 72. When both bits are "1", the AND gate 71 outputs the cell discarding signal.

By determining which bits of the discard mask information should be masked, it becomes possible to obtain arbitrary error mask functions. It is also possible to replace the OR gate 72 with another logic gate or circuit. In the above-mentioned manner, it becomes possible to execute arbitrary error editing processes based on more than one error item.

The ATM cell error processing system of the present invention can be tested the following manner. In a test, a test cell, a special cell for use in testing, is used. The test cell has a special header value, such as special VPI/VCI or special PT different from that of normal cells, and a test cell identification bit which indicated that the cell is a test cell and which is placed in a predetermined bit position in the error flag signal.

Figure 16:
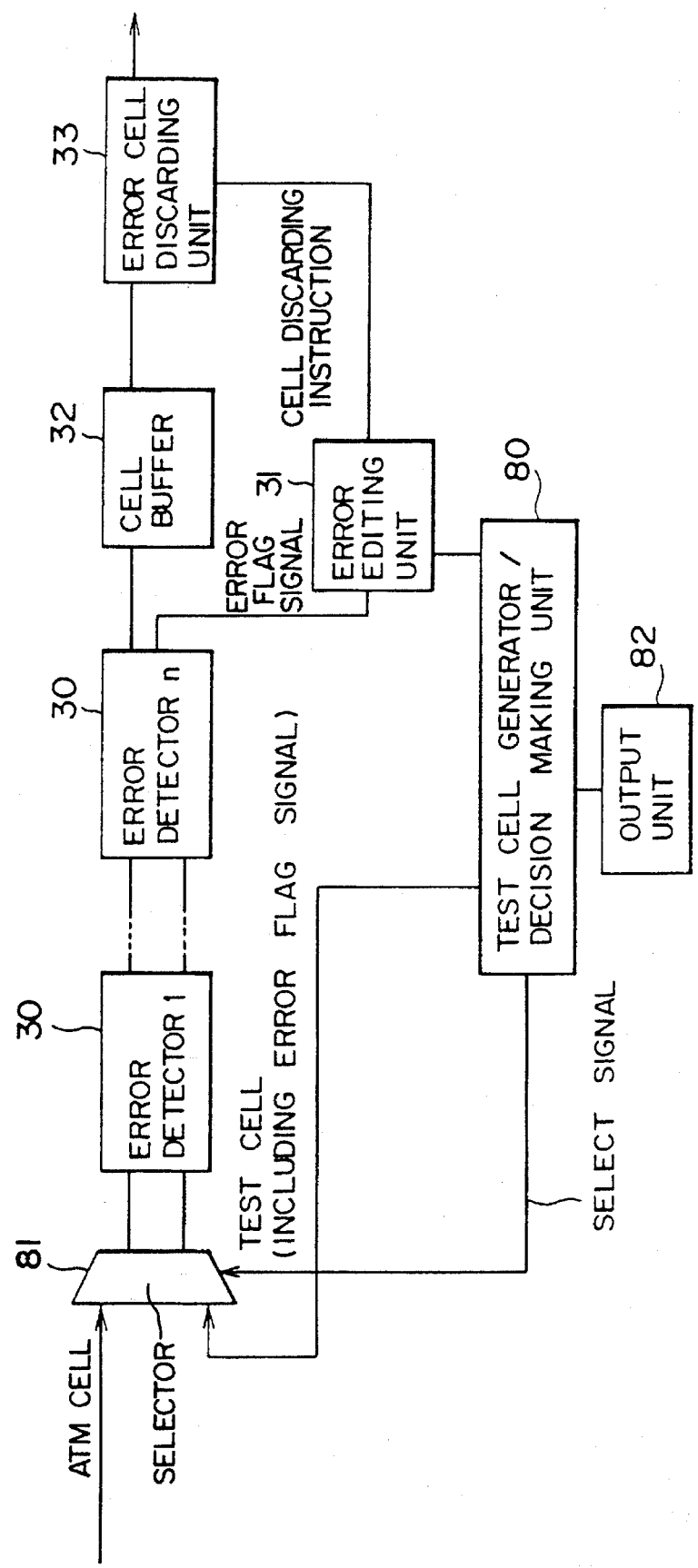
FIG. 16 is a block diagram of yet another structure of the error editing unit used in the embodiments of the present invention.

FIG. 16 is a block diagram of a test system for testing the ATM cell error processing system of the present invention. In FIG. 16, those parts which are the same as those shown in the previous figures are given the same reference numerals. The test system comprises a test cell generator/decision making unit 80, a selector 81, and an output unit 82. The unit 80 generates the above-mentioned test cell in which the special bit that shows the test cell is placed in the predetermined bit position. The test cell is supplied to the selector 81. During testing, the selector 81 selects a test cell in response to a select signal from the unit 80.

The test cell passes through the selector 81, and is sequentially tested by the error detectors 30. The error editing unit 31 receives the error flag signal relating to the test cell from the error detector 30 of the final stage by detecting the test cell identification flag contained therein, and notifies the unit 80 of the identified error flag signal. The unit 80 checks the contents of the error flag signal, and determines whether or not each error detector 30 is operating normally. The results of this check are visually output through the output unit 82, which has a display and/or printer. The error editing unit 31 outputs the cell discarding instruction to the error cell discarding unit 33 in order to discard the test cell.

The above test can be held in either a state where the inflow of normal cells is inhibited (off line) or a state where the test cell is inserted between normal cells (on line). It should be noted that the error detectors 30 can be tested in the same manner as in the case of the error editing processing. This means that the system does not require a special device for extracting the test cell, and a special device for discarding the test cell.

Figure 17:
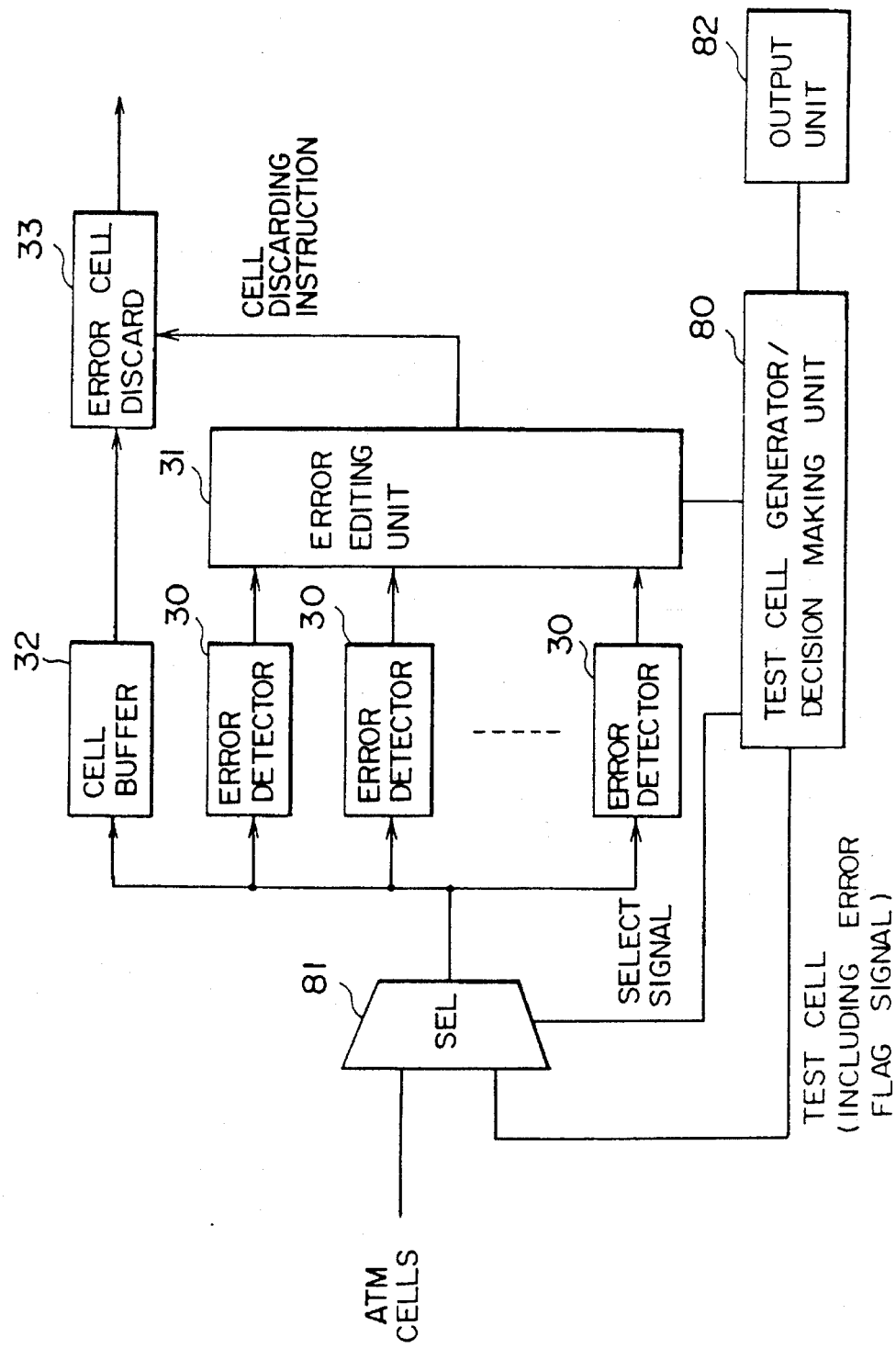
FIG. 17 is a block diagram of an ATM cell error processing system according to a third embodiment of the present invention.

FIG. 17 is a block diagram of an ATM cell error processing system according to a third embodiment of the present invention. In FIG. 17, those parts which are the same as those shown in the previous figures are given the same reference numerals. The error detectors 30 are connected in parallel, as shown in FIG. 17. A cell (normal cell or test cell) passes through the selector 81, and is simultaneously applied to the cell buffer 32 and each of the error detectors 30. It will be noted that the error flag signal lines extending between the selector 81 and each of the error detectors 30, and between each of the error detectors 30 and the error editing unit 31 are omitted for the sake of simplicity. The cell and the error flag signal are applied to each of the error detectors 30. When a cell error is detected, an error flag is set. In this manner, one-bit error flag signals are output to the error editing unit 31 from the respective error detectors 30. The error editing unit 31 executes a predetermined error editing process on the basis of the error flag signals. It is also possible to use the error flag signal used in the previously described system. More simplicity the previously described error flag signal contains error flags of the respective error detectors 30.

According to the present invention, the following advantages are obtained.

First it is not necessary to provide each error detector with a cell buffer. Hence, the hardware structure can be diminished, and the time delay can be reduced.

Second it is possible to execute arbitrary cell editing processing based on the results of the checks obtained at the error detectors. For example, the cell is discarded when two types of error have been detected.

Third it is easy to test the ATM cell error processing system.

The present invention is not limited to the specifically disclosed embodiments, and variations and modifications may be made without departing from the scope of the present invention.

What is claimed is:

1. An Asynchronous Transfer Mode (ATM) cell error processing system for processing errors in ATM cells, said ATM cell error processing system comprising:

a plurality of error detection means for receiving said ATM cells, for detecting predetermined cell errors in each of said ATM cells and for generating respective and corresponding decision signals for said each ATM cell, said respective and corresponding decision signals indicative of whether any of said predetermined cell errors are present in said each ATM cell;

error editing means, operatively coupled to at least one of said plurality of error detection means, for determining for each of said ATM cells whether, based on the respective and corresponding decision signals, a respective ATM cell should be discarded;

buffer means, coupled to at least one of the plurality of error detection means, for temporarily storing at least one of said ATM cells; and error cell discarding means, coupled to said error editing means and said buffer means, for discarding said respective ATM cell from said buffer means when said error editing means determines, based on said respective and corresponding decision signals, that said respective ATM cell should be discarded and for transferring said respective ATM cell to an ATM switching network when said error editing means determines, based on said respective and corresponding decision signal, that said respective ATM cell should not be discarded, said plurality of error detection means being connected in series, and one of the plurality of error detection means, located at a final stage of the series of said plurality of error detection means, being coupled to said error editing means and said buffer means.

2. An Asynchronous Transfer Mode (ATM) cell error processing system as claimed in claim 1, wherein the plurality of error detection means comprises means for inserting said respective and corresponding decision signals into respective, predetermined bit positions of a subsequent ATM cell, each of the plurality of error detection means comprising means for inserting a respective and corresponding decision signal into a respective, predetermined bit position of a subsequent ATM cell.

3. An Asynchronous Transfer Mode (ATM) cell error processing system as claimed in claim 2, wherein each of said respective and corresponding decision signals is a one-bit signal.

4. An Asynchronous Transfer Mode (ATM) cell error processing system as claimed in claim 1, further comprising:

test cell generating means for generating a test cell having, in a predetermined bit position thereof, a bit for identifying the test cell; and selector means, coupled to said test cell generating means, for receiving said test cell and said respective ATM cell, and for outputting, at each operation of said selector means one of a received ATM cell of said ATM cells and said test cell to one of the plurality of error detection means located at a first stage of a series of the error detection means in response to a select signal.

5. An Asynchronous Transfer Mode (ATM) cell error processing system for processing errors in ATM cells, said ATM error processing system comprising:

a plurality of error detection means for receiving said ATM cells, for detecting predetermined cell errors in each of said ATM cells and for generating respective and corresponding decision signals for said each ATM cell, said respective and corresponding decision signals indicative of whether any of said predetermined cell errors are present in said each ATM cell;

error editing means, operatively coupled to at least one of said plurality of error detection means, for determining for each of said ATM cells whether, based on the respective and corresponding decision signals, a respective ATM cell should be discarded;

buffer means, coupled to at least one of the plurality of error detection means, for temporarily storing at least one of said ATM cells; and error cell discarding means, coupled to said error editing means and said buffer means, for discarding said respective ATM cell from said buffer means when said error editing means determines, based on said respective and corresponding decision signals, that said respective ATM cell should be discarded and for transferring said respective ATM cell to an ATM switching network when said error editing means determines, based on said respective and corresponding decision signal, that said respective ATM cell should not be discarded, the plurality of error detection means being connected in parallel, each error detection means coupled to said error editing means, and each ATM cell being simultaneously supplied to the plurality of error detection means and said buffer means.

6. An Asynchronous Transfer Mode (ATM) cell error processing system as claimed in claim 5, further comprising:

test cell generating means for generating test cells, each test cell having, in a predetermined bit position thereof, a bit for identifying the test cell; and selector means, coupled to said test cell generating means, for receiving said test cells and said ATM cells, and for outputting either one of said ATM cells or the test cell to the plurality of error detection means in response to a select signal.

7. An Asynchronous Transfer Mode (ATM) cell error processing system, for processing errors in ATM cells, said ATM cell error processing system comprising:

a plurality of error detection means for receiving said ATM cells, for detecting predetermined cell errors in each of said ATM cells and for generating respective and corresponding decision signals for said each ATM cell, said respective and corresponding decision signals indicative of whether any of said predetermined cell errors are present in said each ATM cell;

error editing means, operatively coupled to at least one of said plurality of error detection means, for determining for each of said ATM cells whether, based on the respective and corresponding decision signals, a respective ATM cell should be discarded;

buffer means, coupled to at least one of the plurality of error detection means, for temporarily storing at least one of said ATM cells;

error cell discarding means, coupled to said error editing means and said buffer means, for discarding said respective ATM cell from said buffer means when said error editing means determines, based on said respective and corresponding decision signals, that said respective ATM cell should be discarded and for transferring said respective ATM cell to an ATM switching network when said error editing means determines, based on said respective and corresponding decision signal, that said respective ATM cell should not be discarded; and transfer means for transferring the respective and corresponding decision signals to said error editing means via a first signal line coupled between said transfer means and said error editing means, and said respective ATM cell via a second signal line coupled between said transfer means and said error editing means, different than said first signal line.

8. An Asynchronous Transfer Mode (ATM) cell error processing system as claimed in claim 7, wherein:

said first signal line transfers an error flag signal; and each of said plurality of error detection means respectively comprises means for inserting, as error flags, the respective and corresponding decision signals into said error flag signal.

9. An Asynchronous Transfer Mode (ATM) cell error processing system as claimed in claim 8, wherein said error flag signal is synchronized with an output of said ATM cell.

10. An Asynchronous Transfer Mode (ATM) cell error processing system, for processing errors in ATM cells, said ATM cell error processing system comprising:

a plurality of error detection means for receiving said ATM cells, for detecting predetermined cell errors in each of said ATM cells and for generating respective and corresponding decision signals for said each ATM cell, said respective and corresponding decision signals indicative of whether any of said predetermined cell errors are present in said each ATM cell;

error editing means, operatively coupled to at least one of said plurality of error detection means, for determining for each of said ATM cells whether, based on the respective and corresponding decision signals, a respective ATM cell should be discarded;

buffer means, coupled to at least one of the plurality of error detection means, for temporarily storing at least one of said ATM cells; and error cell discarding means, coupled to said error editing means and said buffer means, for discarding said respective ATM cell from said buffer means when said error editing means determines, based on said respective and corresponding decision signals, that said respective ATM cell should be discarded and for transferring said respective ATM cell to an ATM switching network when said error editing means determines, based on said respective and corresponding decision signal, that said respective ATM cell should not be discarded, said error editing means comprising logic means for executing a predetermined logic operation on said respective and corresponding decision signals and obtaining a result, and for determining whether said respective ATM cell should be discarded based on the result of said predetermined logic operation.

11. An Asynchronous Transfer Mode (ATM) cell error processing system as claimed in claim 10, wherein said predetermined logic operation determines that said respective ATM cell should be discarded when at least two of said respective and corresponding decision signals indicate any of said predetermined cell errors are present.

12. An Asynchronous Transfer Mode (ATM) cell error processing system as claimed in claim 10, wherein said error editing means comprises error register means, coupled to said logic means, for temporarily storing said respective and corresponding decision signals transferred from said plurality of error detection means.

13. An Asynchronous Transfer Mode (ATM) cell error processing system for processing errors in ATM cells, said ATM cell error processing system comprising:

a plurality of error detection means for receiving said ATM cells, for detecting predetermined cell errors in each of said ATM cells and for generating respective and corresponding decision signals for said each ATM cell, said respective and corresponding decision signals indicative of whether any of said predetermined cell errors are present in said each ATM cell;

error editing means, operatively coupled to at least one of said plurality of error detection means, for determining for each of said ATM cells whether, based on the respective and corresponding decision signals, a respective ATM cell should be discarded, said error editing means comprising:

error register means for storing said respective and corresponding decision signals transferred from the plurality of error detection means, masking logic means, coupled to said error register means, for receiving said respective and corresponding decision signals, for executing a masking logic operation on said respective and corresponding decision signals from said error register means and error masking information, and selecting decision signals from all of said respective and corresponding decision signals from said error register means, based on said error masking information, and cell discarding logic means, coupled to said masking logic means, for executing a cell discarding logic operation based on the respective and corresponding decision signals selected by said masking logic means;

buffer means, coupled to at least one of the plurality of error detection means, for temporarily storing at least one of said ATM cells; and error cell discarding means, coupled to said error editing means and said buffer means, for discarding said respective ATM cell from said buffer means when said error editing means determines, based on said respective and corresponding decision signals, that said respective ATM cell should be discarded and for transferring said respective ATM cell to an ATM switching network when said error editing means determines, based on said respective and corresponding decision signal, that said respective ATM cell should not be discarded.

14. An Asynchronous Transfer Mode (ATM) cell error processing system as claimed in claim 13, wherein:

said error register means comprising AND gates; and said cell discarding logic means comprises an OR gate.

15. An Asynchronous Transfer Mode (ATM) cell error processing system for processing errors in ATM cells, said ATM cell error processing system comprising:

a plurality of error detection means for receiving said ATM cells, for detecting predetermined cell errors in each of said ATM cells and for generating respective and corresponding decision signals for said each ATM cell, said respective and corresponding decision signals indicative of whether any of said predetermined cell errors are present in said each ATM cell;

error editing means, operatively coupled to at least one of said plurality of error detection means, for determining for each of said ATM cells whether, based on the respective and corresponding decision signals, a respective ATM cell should be discarded;

buffer means, coupled to at least one of the plurality of error detection means, for temporarily storing at least one of said ATM cells; and error cell discarding means, coupled to said error editing means and said buffer means, for discarding said respective ATM cell from said buffer means when said error editing means determines, based on said respective and corresponding decision signals, that said respective ATM cell should be discarded and for transferring said respective ATM cell to an ATM switching network when said error editing means determines, based on said respective and corresponding decision signal, that said respective ATM cell should not be discarded.

16. An Asynchronous Transfer Mode (ATM) system including an ATM switch performing switching between ATM cells, and a message processing unit coupled to said ATM switch, for performing an exchanging operation between the ATM cells and a message of an upper layer, said message processing unit including an ATM cell error processing system which detects errors introduced during the exchanging operation, said ATM cell error processing system comprising:

a plurality of error detection means for detecting predetermined cell errors in said ATM cells and for generating decision signals indicative of whether any of said predetermining cell errors are present in each of said ATM cells, each of said plurality of error detection means detecting at least one of said predetermined cell errors for a respective ATM cell and generating a respective decision signal;

error editing means, operatively coupled to said plurality of error detection means, for determining for each of said ATM cells whether, based on the respective decision signal, a respective ATM cell should be discarded;

buffer means, coupled to at least one error detection means of the plurality of error detection means, for temporarily storing at least one ATM cell of said ATM cells; and error cell discarding means, coupled to said error editing means and said buffer means, for discarding the at least one ATM cell of said ATM cells from said buffer means when said error editing means determines, based on said respective decision signal, that said at least one ATM cell should be discarded and for transferring said at least one ATM cell when said error editing means determines, based on said respective decision signal, that said at least one ATM cell should not be discarded.

\* \* \* \* \*

UNITED STATES PATENT AND TRADEMARK OFFICE
CERTIFICATE OF CORRECTION

PATENT NO. : 5,513,191
DATED : Apr. 30, 1996
INVENTOR(S) : TAKECHI et al.

It is certified that error appears in the above-indentified patent and that said Letters Patent is hereby corrected as shown below:

Col. 1, line 17, change "Fig:." to --Fig.--;
line 23, after "services" insert --.--;
line 37, change "44 bytes" to --44-bytes--;
line 38, change "four bytes" to --four-bytes--;
line 40, change "two bits" to --two-bits--;
line 63, change "no teach" to --not each--.

Figure 6:
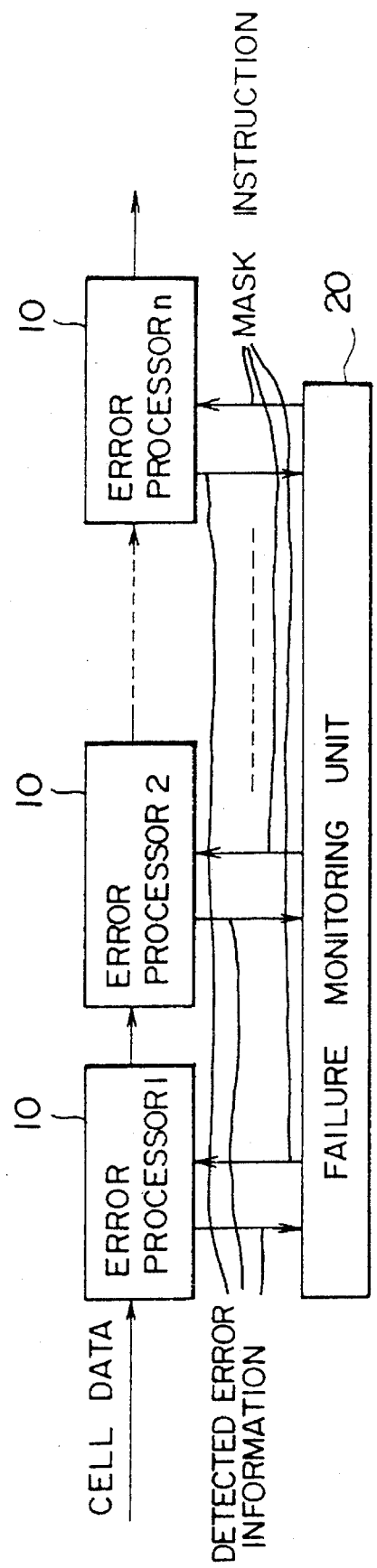
FIG. 6 is a block diagram of another conventional ATM cell error processing system.

Col. 2, line 43, change "Fig, 6" to --Fig. 6--.

Col. 3, line 5, after "signals" insert --;--;
line 10, after "unit" insert --,--.

Col. 4, line 23, change "cells," to --cells.--;
line 33, after "Therefore" insert --,--;
line 35, change "all" to --are--;
line 40, change "and" (both occurrences) to --an--;
line 41, delete "is".

Col. 5, line 37, change "signed" to --signal--;
line 55, change "signals" to --signal--.

Col. 6, line 61, change "indicated" to --indicates--.

UNITED STATES PATENT AND TRADEMARK OFFICE
CERTIFICATE OF CORRECTION

PATENT NO. : 5,513,191
DATED : Apr. 30, 1996
INVENTOR(S) : TAKECHI et al.

It is certified that error appears in the above-indentified patent and that said Letters Patent is hereby corrected as shown below:

Col. 7, line 49, change "simplicity" to --specifically--;
       line 54, after "First" insert --,--;
       line 57, after "Second" insert --,--;
       line 61, after "Third" insert --,--.

Col. 12, line 36 (claim 16, line 13), change "predetermining" to --predetermined--.

Signed and Sealed this

Twentieth Day of August, 1996

Attest:

BRUCE LEHMAN

Attesting Officer     Commissioner of Patents and Trademarks